Patented Jan. 11, 1944

2,338,815

UNITED STATES PATENT OFFICE 2,338,815

VULCANIZATION ACCELERATOR

Paul C. Jones, Silver Lake, and Roger A. Mathes, Akron, Ohio, assignors to The B. F. Goodrich Company, New York, N. Y., a corporation of New York No Drawing. Application December 24, 1940, Serial No. 371,580

8 Claims. (Cl. 260—787)

This invention relates to an accelerator for the vulcanization of rubber and pertains specifically to the alkylol carbamide derivatives of the mercapto thiazolines.

It has long been known that the time required for vulcanization of rubber compositions can be greatly reduced by means of substances known as accelerators. Among the most effective of these accelerators are the mercaptothiazoles; for example, mercaptobenzothiazole; however, the mercaptothiazolines, although possessing a similar structure, have been reported as weak accelerators.

We have found that the reaction products of one or two moles of a mercaptothiazoline and one mole of a substituted urea such as methylol carbamide, or ethylol carbamide, compounds which have never before been made, while exhibiting a desirable delayed action effect, are very effective accelerators. These new compounds may be activated with fatty acids or their metallic salts just as has been shown to be the case with the mercaptothiazolines in our co-pending application Serial No. 255,358, filed February 8, 1939.

Acids which exhibit this activating property are the mono-carboxylic acids, saturated or unsaturated, including, among others, lauric, stearic, oleic, caprylic, linoleic, benzoic, salicylic, and the like; metallic salts which are effective comprise the lead, tin, zinc, magnesium, calcium, or other alkali, alkaline earth, or heavy metal salts of these acids. Lower fatty acids may be used, but the higher members of the series are preferred. Although mere traces of the above materials have an activating effect, it is preferred to use from 1% to 5% or more in the rubber composition.

Among the mercapto thiazolines which may be used to make our new accelerators are 2-mercaptothiazoline, 2-mercapto 4-methyl thiazoline, 2-mercapto 5-methyl thiazoline, 2-mercapto 4,5-dimethyl thiazoline, 2-mercapto 4-ethyl thiazoline, 2-mercapto 4,5-diethyl thiazoline, 2-mercapto 4-phenyl thiazoline, 2-mercapto 5-p-nitrophenyl thiazoline, 2-mercapto 4,5-tetramethylene thiazoline, and the like. The carbamides used are compounds containing the structure

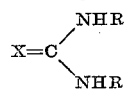

wherein X is sulfur or oxygen, and R is a hydroxy alkyl group, for example dimethylol urea, diethylol urea, di-isopropylol urea, etc.

As a specific example of our invention 2-mercapto thiazoline and dimethylol carbamide have been reacted in a molecular ratio of two to one. The reaction is believed to take place as follows:

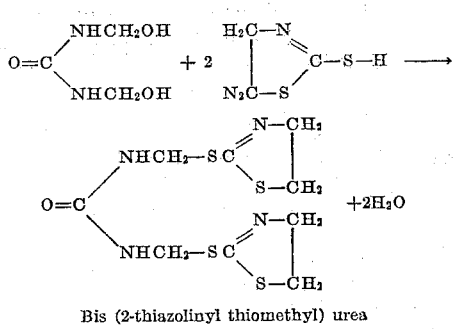

Bis (2-thiazolinyl thiomethyl) urea

The reaction is carried out preferably by refluxing the reactants with a convenient quantity of a suitable organic solvent such as ethyl alcohol for 24 to 48 hours. The product obtained is filtered off, washed with ethyl alcohol, and dried.

As an illustration of the accelerating power and the delayed action effect of our new accelerators the following composition was prepared:

Rubber _____ 100
Zinc oxide _____ 5
Sulfur _____ 3
Lauric acid _____ 3
Reaction product of 2-mercapto thiazoline and dimethylol carbamide _____ 1

When cured in a mold at the temperatures and times indicated, this composition exhibited the following properties:

| Cure temperature, °F. | Time of cure | Modulus of elasticity at 600% elongation | Tensile strength at break | Ultimate elongation |
|---|---|---|---|---|
| | Minutes | | Lbs. per sq. in. | Per cent |
| 220 | 60 | (1) | | |
| | 90 | (1) | | |
| | 120 | 70 | 480 | 1,060 |
| 240 | 15 | (1) | | |
| | 30 | (1) | | |
| | 60 | 120 | 1,290 | 1,090 |
| | 90 | 350 | 3,000 | 970 |
| 287 | 15 | 410 | 2,610 | 930 |
| | 30 | 1,060 | 3,370 | 790 |
| | 60 | 1,460 | 3,530 | 740 |

[1] Undercured.

It will be observed from these data that our new accelerators have excellent delayed action properties, and that tight cures, as evinced by the relatively low elongations of the well-cured stocks, are obtained.

Our new accelerators are effective not only with natural rubber or caoutchouc, but also with balata, gutta percha, latex, rubber isomers, or any synthetic rubber which can be vulcanized, that is, which loses its property of thermoplasticity and becomes elastic when heated in the presence of sulfur, and the term "a rubber" is used in the claims to designate all of the above-mentioned materials. Other materials, such as pigments, fillers, softeners, antioxidants, other accelerators, etc., may be present in the composition.

Our new accelerators can be used for the vulcanization of compositions of the most varied kinds, such as those used in pneumatic and solid tires, belting, hose, footwear, surgical goods, and all manner of molded products and latex dipped goods, and the like.

Any method of vulcanization may be used for these compositions, such as heating in a mold, in steam, hot air, hot water, etc.

Although we have herein disclosed specific embodiments of our invention, we do not intend to exclude modifications and variations which lie within the spirit and scope of the appended claims.

We claim:

1. The process which comprises vulcanizing a rubber in the presence of a substituted urea having the structure

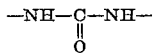

in which there is attached to at least one of the nitrogen atoms a group of the structure

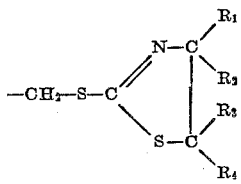

in which $R_1$, $R_2$, $R_3$, and $R_4$ are members of the class consisting of hydrogen, hydrocarbon, and alkyl ether groups, any remaining free valence being satisfied by a hydroxy akyl group; and in the presence of a member of the class consisting of monocarboxylic acids and their metallic salts.

2. The process which comprises vulcanizing a rubber in the presence of a substituted urea having the structure

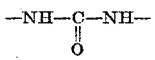

in which there is attached to each nitrogen atom a group of the structure

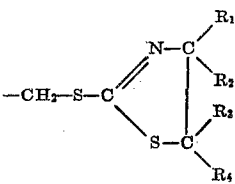

in which $R_1$, $R_2$, $R_3$, and $R_4$ are members of the class consisting of hydrogen, hydrocarbon, and alkyl ether groups; and in the presence of a member of the class consisting of monocarboxylic acids and their metallic salts.

3. The process which comprises vulcanizing a rubber in the presence of a substituted urea having the structure

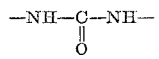

in which there is attached to one nitrogen atom a group of the structure

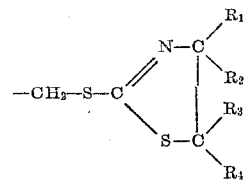

in which $R_1$, $R_2$, $R_3$, and $R_4$ are members of the class consisting of hydrogen, hydrocarbon, and alkyl ether groups, the remaining nitrogen atom being attached to a hydroxy alkyl group; and in the presence of a member of the class consisting of monocarboxylic acids and their metallic salts.

4. The process which comprises vulcanizing a rubber in the presence of a compound having the structure

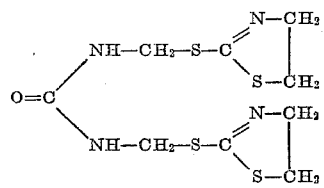

and in the presence of a member of the class consisting of monocarboxylic acids and their metallic salts.

5. A composition comprising a rubber vulcanized in the presence of a substituted urea having the structure

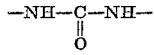

in which there in attached to at least one nitrogen atom a group of the structure

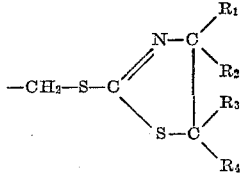

in which $R_1$, $R_2$, $R_3$, and $R_4$ are members of the class consisting of hydrogen, hydrocarbon, and alkyl ether groups, any remaining free valence being satisfied by a hydroxy alkyl group; and in the presence of a member of the class consisting of monocarboxylic acids and their metallic salts.

6. A composition comprising a rubber vulcanized in the presence of a substituted urea having the structure

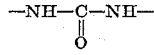

in which there is attached to each nitrogen atom a group of the structure

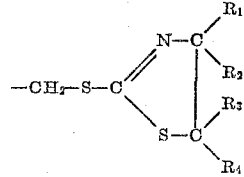

in which $R_1$, $R_2$, $R_3$, and $R_4$ are members of the class consisting of hydrogen, hydrocarbon, and alkyl ether groups; and in the presence of a member of the class consisting of monocarboxylic acids and their metallic salts.

7. A composition comprising a rubber vulcanized in the presence of a substituted urea having the structure

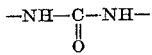

in which there is attached to one nitrogen atom a group of the structure

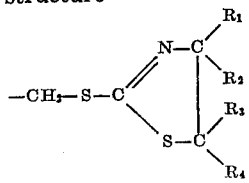

in which $R_1$, $R_2$, $R_3$, and $R_4$ are members of the class consisting of hydrogen, hydrocarbon, and alkyl ether groups, the remaining nitrogen atom being attached to a hydroxy alkyl group; and in the presence of a member of the class consisting of monocarboxylic acids and their metallic salts.

8. A composition comprising a rubber vulcanized in the presence of a compound having the structure

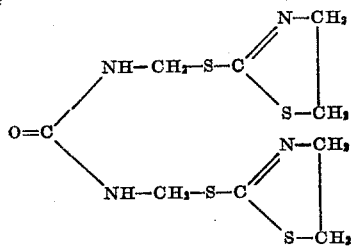

and in the presence of a member of the class consisting of monocarboxylic acids and their metallic salts.

PAUL C. JONES.
ROGER A. MATHES.